United States Patent
Pankajakshan et al.

(10) Patent No.: US 8,520,577 B1
(45) Date of Patent: Aug. 27, 2013

(54) MOBILE DEVICE ASSISTED HANDOFF

(75) Inventors: Bejoy Pankajakshan, Plano, TX (US);
Erik Kosar, Richardson, TX (US);
Robert Wondoloski, Richardson, TX (US)

(73) Assignee: Metropcs Wireless, Inc., Richardson, TX (US)

( * ) Notice: Subject to any disclaimer, the term of this patent is extended or adjusted under 35 U.S.C. 154(b) by 0 days.

(21) Appl. No.: 13/549,687

(22) Filed: Jul. 16, 2012

(51) Int. Cl.
*H04B 7/00* (2006.01)
*H04H 20/71* (2008.01)
*H04W 4/00* (2009.01)
*H04W 36/00* (2009.01)

(52) U.S. Cl.
USPC ............ 370/310; 370/312; 370/331; 455/436

(58) Field of Classification Search
USPC .................................. 370/312; 455/436–444
See application file for complete search history.

(56) References Cited

U.S. PATENT DOCUMENTS

| | | | |
|---|---|---|---|
| 2001/0055969 A1* | 12/2001 | Bonta et al. | 455/436 |
| 2002/0019231 A1* | 2/2002 | Palenius et al. | 455/437 |
| 2002/0037726 A1* | 3/2002 | Czaja et al. | 455/442 |
| 2002/0049058 A1* | 4/2002 | Tee | 455/437 |
| 2002/0065080 A1* | 5/2002 | Pittampalli et al. | 455/439 |
| 2011/0164589 A1* | 7/2011 | Lee et al. | 370/331 |

* cited by examiner

*Primary Examiner* — Jason Mattis
*Assistant Examiner* — Stephen J Clawson
(74) *Attorney, Agent, or Firm* — Howison & Arnott, L.L.P.

(57) ABSTRACT

A method for controlling a handoff from a first base station to a second base station involves receiving a hand off request including connection data from a client of a mobile device from the first base station at a handoff server of a system network provider. Handoff data is generated for controlling the handoff from the first base station to the second base station responsive to the connection data. The handoff data is transmitted from the handoff server of the system network provider to the client of the mobile device.

11 Claims, 1 Drawing Sheet

MOBILE DEVICE ASSISTED HANDOFF

TECHNICAL FIELD

The present invention relates to the handoff of mobile devices from one base station to another base station, and more particularly, to the use of information provided from the mobile device to assist in the handoff of one base station to another base station.

BACKGROUND

Within presently existing wireless communications, a mobile device is provided connection to a communication network through a base station that provides bi-directional voice communications from the mobile device to the base station and the base station provides the information to a wireless network. When a mobile device is moving, it will often require the communications link to be passed from one base station to another base station as the mobile device leaves the radio coverage area of the first base station and enters the radio coverage area of a second base station. Within existing solutions, a network service provider server controls this transfer process. Within dense urban or high speed environments, where a cell signal serving a mobile device from a base station can degrade rapidly; this situation may adversely affect performance of real-time services such as Voice over IP. Thus, a solution that provides better performance for rapidly degrading cell signals for realtime services on a network would be beneficial. The handoff of a mobile device from a first base station to a second base station would be greatly assisted by the provision of additional information to the controlling base station. Thus, some manner for providing for this solution would be of great benefit to wireless network service providers.

SUMMARY

The present invention, as disclosed and described herein, in one aspect thereof, comprises a method for controlling a handoff from a first base station to a second base station that involves receiving a hand off request including connection data from a client of a mobile device at a handoff server of a system network provider. Handoff data is generated for controlling the handoff from the first base station to the second base station responsive to the connection data. The handoff data is transmitted from the handoff server of the system network provider to the client of the mobile device.

BRIEF DESCRIPTION OF THE DRAWINGS

For a more complete understanding, reference is now made to the following description taken in conjunction with the accompanying Drawings in which.

DETAILED DESCRIPTION

Figure 1:
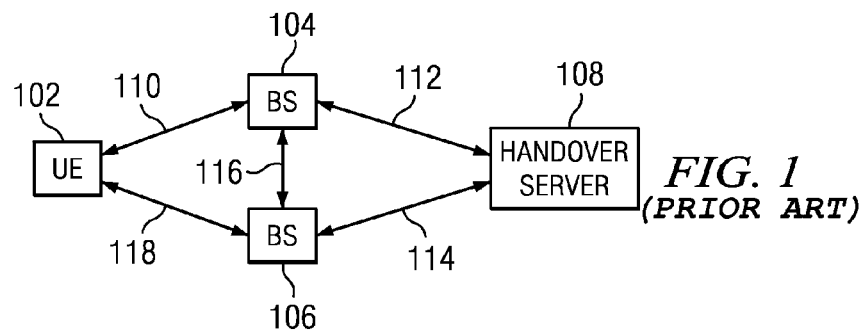
FIG. 1 is an illustration of a call handover process according to present network provider control handoff protocols.

Referring now to the drawings, wherein like reference numbers are used herein to designate like elements throughout, the various views and embodiments of a mobile device assisted handoff are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to the drawings, and more particularly to FIG. 1, there is illustrated the present process for a handoff of user equipment (UE) 102. The user equipment 102 may comprise a cellular telephone, pager, PDA, laptop computer, tablet, or any other type of mobile device. A handover server 108 controls the handover of the user equipment 102 from a first base station 104 to a second base station 106. The network establishes an initial communications link 110 from the user equipment 102 to the base station 104. However, in a situation where the user equipment 102 is moving with respect to the base station 104, the communications link 110 between the user equipment 102 and base station 104 may become unable to be maintained due to a lack of signal strength. In this case, the base station 104 communicates with a system provider handover server 108 over a communications link 112 through which the handover server 108 may determine a new base station 106 to which the base station 104 should hand over the call from user equipment 102.

In the present example, the handover server 108 determines that base station 104 should handover the call to base station 106. This information is transmitted to base station 104 over communications link 112 and to base station 106 over communications link 114. Additionally, base station 104 and base station 106 may coordinate the handover using a communications link 116 between each of the base stations. The handover server 108 controls the base station 104 and base station 106 to handover the user equipment 102 to base station 106 and establish a new communications link 118. After the new communications link 118 is established, the previous communications link 110 to base station 104 may be dropped and the call of the user equipment 102 controlled by base station 106. This process may be used to again hand off the user equipment 102 to other base stations as needed.

Figure 2:
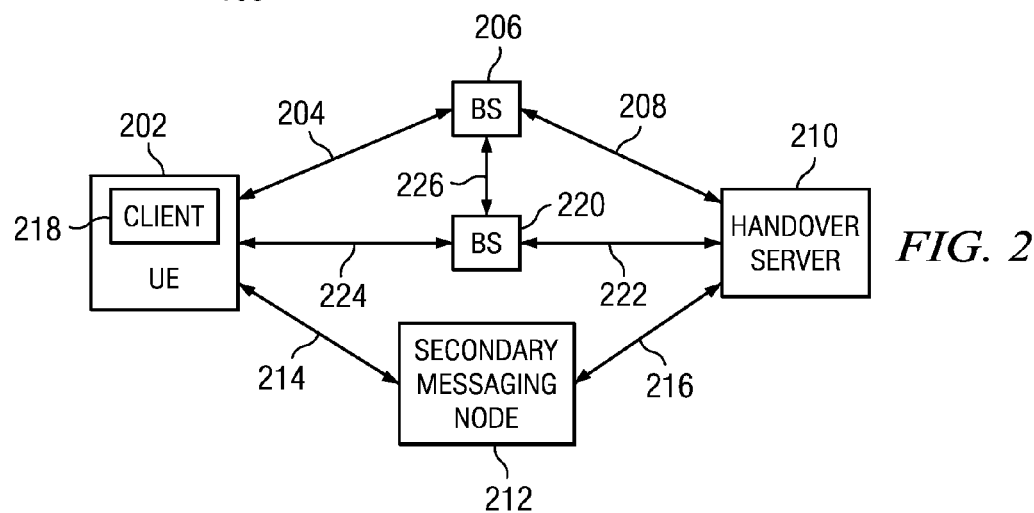
FIG. 2 illustrates a mobile device assisted handoff.

Within dense urban or high speed environments, the communications link between the user equipment and the base station signal can rapidly degrade with little warning. This situation can adversely affect the performance of realtime services provided over the wireless communications link such as Voice over IP. Referring now to FIG. 2, there is illustrated a solution for providing better performance for the realtime services provided over LTE by providing a user equipment assisted handoff in addition to the information provided by the handover server. Within the implementation of FIG. 2, the user equipment 202 has an initial communications link 204 between the user equipment 202 and a first base station 206. The base station 206 additionally has a connection 208 with the handover server 210 provided by the network service provider.

In order to provide more updated and realtime information to the handover server 210, rather than just accepting handover information from the base station 206 over the communications link 208, the user equipment 202 may also provide handover information to the handover server 210. The user equipment 202 may provide this information directly from the user equipment or through the handover server 210. The user equipment 202 may also provide the information to the handover server 210 through a secondary messaging node 212. The user equipment 202 establishes a first wireless link 214 from the user equipment 202 to the secondary messaging node 212. The secondary messaging node 212 establishes a connection 216 to the handover server 210. The secondary messaging node 212 can comprise any type of network connection such as a Wi-Fi network, a messaging server, alternate access technology network if dual radios are available on the user equipment, etc.

The user equipment 202 additionally includes a client 218. The client 218 is responsible for taking measurements with respect to various connection information relevant to controlling a handoff from a first base station 206 to a second base station 220. This information may include, for example, signal strength, mobility state of the use, application type to determine if hard or soft handoff can be used, connection speed, throughput, packet loss or other relevant factors. The client 218 establishes the connection 214 from the user equipment 202 to the secondary messaging node 212 such that information may be provided to assist in the handover to the handover server 210. The client 218 provides this information to the handover server 210 through the secondary messaging node 212, and the handover server 210 utilizes the information provided from the client 218 of the user equipment 202 and the information from the base station 206 over communications link 208 to control a handover process. During the handover process, the handover server 210 instructs the base station 220 over a communications link 222 to establish a second communications link 224 between the user equipment 202 and the base station 220. After the communications link 224 is established, the communications link 204 between the user equipment 202 and the base station 206 may be dropped. The base station 206 and base station 220 communicate with each other over a communications link 226 to enable each base station to know when the new communications link 224 has been created.

Figure 3:
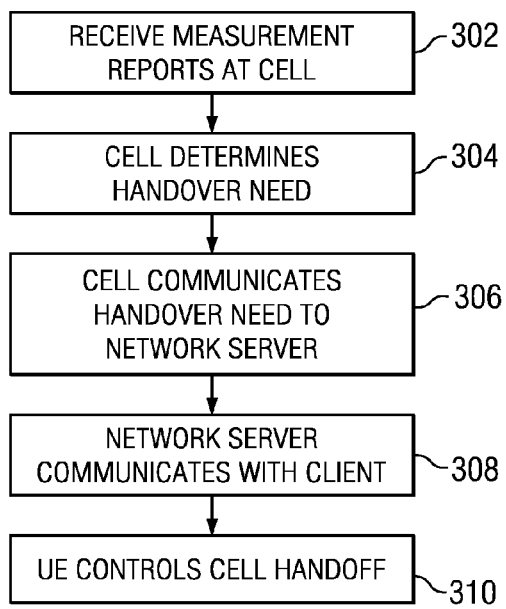
FIG. 3 is a flow diagram describing a mobile device assisted handoff.

Referring now to FIG. 3, there is illustrated a flow diagram describing the process by which the user equipment 202 may assist the handover server 210 in a handover from a first base station 206 to a second base station 220. Initially, various measurement reports are received at step 302 from the client 218 upon the user equipment 202. This information may be received at either the base station 206 presently serving the user equipment 202 or at the secondary messaging node 212 within the secondary network that the user equipment 202 with which has established a connection. Next, at step 304, the base station 206 communicating with the user equipment 202 determines the need for a handover of the call connection of the user equipment to a new base station based upon the reduced connection stability of the existing wireless connection. The base station 206 communicates at step 306 to the handover server 210 the need for a handover from the present base station 206 to a new base station 220. Responsive to this communication from the base station 206, the handover server 210 communicates with the client 218 within the user equipment 202 to provide information with respect to the target base station to which the call from the user equipment needs to be handed over. The handover server 210 exchanges this information through the secondary messaging node 212 using XML or other type of messaging with a client 218 in order to provide more information upon the target base station 220. As described before, one example of a secondary messaging node 212 which may be utilized from the handover server 210 and the user equipment 202 may comprise, for example, a Wi-Fi network. The user equipment 202 utilizes the information provided from the handover server 210 in order to control a handover from a base station 206 to the base station 220.

The above-described system and method provides the ability for the user equipment 202 to interact with the network handover server 210 in order to assist in the handover from a first base station 206 to a second base station 220 when providing realtime services over an LTE or other type of network. This user assisted handoff will provide for fast and reliable mobility support that is essential for realtime services such as Voice over IP in an LTE network. The user assisted handoff will be useful within dense urban or high speed communication environments where the serving cell signal can rapidly downgrade to changing environmental conditions and adversely affect the performance of realtime services.

It will be appreciated by those skilled in the art having the benefit of this disclosure that this mobile device assisted handoff provides improved control of connections to a mobile device. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method for controlling a handoff from a first base station of a cellular communication network to a second base station of the cellular communication network, comprising:
receiving a hand off request generated at the first base station at a handoff server of a system network provider over a primary connection on the cellular communication network
establishing a secondary connection between the handoff server and a client of the mobile device through a non-cellular communications network different from the cellular communications network presently providing the connection between the mobile device and the first base station;
receiving connection data generated at a client of the mobile device over the secondary connection;
generating handoff data for controlling the handoff from the first base station to the second base station responsive to the handoff request and the connection data; and
transmitting the handoff data from the handoff server to the mobile device over the secondary connection on the non-cellular communications network.

2. The method of claim 1 further including:
receiving at the first base station, the connection data from the client within the mobile device, the connection data relating to a strength of a connection between the mobile device and the first base station;
determining that a handoff from the first base station is required responsive to the connection data; and
generating the handoff request including the connection data responsive to the determination; and
transmitting the hand off request from the first base station to the handoff server.

3. The method of claim 2 further including:
generating the connection data at the client of the mobile device; and
transmitting the connection data from the client to the handoff server over a connection through the first base station.

4. The method of claim 1 further comprising the step of controlling the handoff of the mobile device from the first base station to the second base station using the handoff data.

5. The method of claim 1, wherein the step of transmitting further comprises the step of transmitting the handoff data from the handoff server of the system network provider to the client of the mobile device over an existing wireless connection between the first base station and the mobile device.

6. The method of claim 1 further comprising the step of controlling the handoff of the mobile device from the first base station to the second base station using the handoff data through the mobile device.

7. A method for controlling a handoff from a first base station of a cellular communication network to a second base station of the cellular communication network, comprising:
  generating connection data at a client of the mobile device, the connection data relating to a strength of a connection between the mobile device and the first base station;
  establishing a secondary connection over a non-cellular communications network between the client and a handoff server;
  transmitting the connection data from the client to the handoff server over the secondary connection between the mobile device and the handoff server;
  receiving the connection data from the client within the mobile device at the handoff server;
  generating a handoff request at the first base station;
  providing the handoff request from the first base station to the handoff server of a system network provider over a first connection on the cellular communications network;
  generating handoff data for controlling the handoff from the first base station to the second base station responsive to the handoff request and the connection data from the client;
  transmitting the handoff data from the handoff server of the system network provider to the client of the mobile device through the secondary connection; and
  controlling the handoff of the mobile device from the first base station to the second base station using the handoff data.

8. A system for controlling a handoff from a first base station of a cellular communication network to a second base station of the cellular communication network, comprising:
  a client within a mobile device for generating connection data at the client of the mobile device, the connection data relating to a strength of a connection between the mobile device and the first base station, the client further transmitting the connection data from the client to a handover server on a secondary connection on a non-cellular communications network; and
  a handoff server of the network service provider for receiving a handoff request generated by the first base station on a primary connection on the cellular communications network and generating handoff data for controlling the handoff from the first base station to the second base station responsive to the handoff request and the connection data, the handoff server further transmitting the handoff data from the handoff server of the system network provider to the client of the mobile device through secondary connection on the non-cellular connections network.

9. The system of claim 8, wherein the client further controls the handoff of the mobile device from the first base station to the second base station using the handoff data.

10. A system for controlling a handoff from a first base station of a cellular communication network to a second base station of the cellular communication network, comprising:
  a handoff server of a network service provider for receiving a handoff request from a first base station over a first communications link on the cellular communications network, for receiving connection data from a client within a mobile device over a secondary communications link on a non-cellular communications network and generating handoff data for controlling the handoff from the first base station to the second base station responsive to the handoff request through the secondary communications link and the connection data; and
  wherein the handoff server further transmits the handoff data from the handoff server of the system network provider to a client of a mobile device through the secondary communications link on the non-cellular communications network.

11. The system of claim 10, wherein the handoff server transmits the handoff data from the handoff server to the client of the mobile device over an existing wireless connection between the first base station and the mobile device.

* * * * *